United States Patent [19]
Arieh

[11] 3,967,720
[45] July 6, 1976

[54] BELT CONVEYORS

[75] Inventor: Simon Arieh, Geneva, Switzerland

[73] Assignee: Battelle Memorial Institute, Geneva, Switzerland

[22] Filed: May 15, 1974

[21] Appl. No.: 470,290

[30] Foreign Application Priority Data
May 16, 1973 Switzerland.......................... 6942/73

[52] U.S. Cl................................. 198/193; 198/203
[51] Int. Cl.².......................................... B65G 16/30
[58] Field of Search ............. 198/203, 193; 74/237; 161/44, 43, 49, 78

[56] References Cited
UNITED STATES PATENTS
3,658,166    4/1972    Hara et al.......................... 198/203
3,666,085    5/1972    Folkes................................ 198/203

Primary Examiner—James B. Marbert
Attorney, Agent, or Firm—Haseltine, Lake & Waters

[57] ABSTRACT

A belt conveyor which comprises two flexible elementary belts (1,2) each provided with a longitudinal reinforcement (16,17) embedded along the neutral axis of the belt, and with a number of projections and recesses which fit exactly in one another when the two belts are brought into contact along a straight section used for conveying loads. The two belts are thus interlocked and form a rigid beam (7,8) with a high flexural strength along the straight section. With each change in direction of the conveyor, the belts follow separate paths where they can readily be curved by virtue of the flexibility of each belt.

9 Claims, 7 Drawing Figures

BELT CONVEYORS

BACKGROUND OF THE INVENTION

It is known that any conventional endless conveyor belt constantly undergoes more or less considerable deformation in operation, and requires adequate tensioning to enable it to be driven by a drive drum. However, this deformation involves a loss of energy and the risk of more or less rapid deterioration of the belt, and for this reason should be limited as far as possible. It is for this reason that the belt is generally guided and supported along its path by series of rollers, the spacing between which is selected in dependence upon the tension of the belt, its rigidity, the load to be supported, etc. so as to reduce deformation to acceptable limits. For example, the longitudinal spacing of the rollers can be of the order of 1 meter in the case of a belt used for conveying bulk goods, whereas it is generally only 10 to 20 cm in the case of a belt of the kind used for carrying passengers, not only to reduce deformation but also to provide an adequate level of comfort.

In most conventional conveyor belts, the rollers involve fairly considerable capital investment and, in addition, have to be regularly serviced at not inconsiderable expense. Accordingly, there is an obvious advantage in reducing the number of rollers associated with a conveyor belt as far as possible while, at the same time, avoiding any increase in the deformation of the conveyor belt. However, it would only be possible by using a belt of high longitudinal rigidity to reduce the number of rollers by increasing the spacing between them while, at the same time, keeping deformation of the belt within acceptable limits. However, the conveyor belt has to have adequate longitudinal flexibility to enable it to follow the changes in level imposed by its travel and, in particular, to travel satisfactorily around return drums of fairly small diameter. Accordingly, there are two incompatible requirements to be satisfied, namely high longitudinal rigidity and flexibility. It has not been possible in conventional conveyors to solve this problem, rather has it always been necessary to make a compromise between these two requirements and, hence, to use a more or less large number of rollers to limit longitudinal flexure of the conveyor belt along the straight sections of its path intended for conveying loads.

For example, conveyors comprising a main endless belt intended for conveying loads and driven by one or more auxiliary belts, have been in use for some time. The auxiliary belts enable the cross-section of the main belt to be limited, especially in the case of a very long conveyor, thereby limiting the tensile stresses to which the belt is subjected.

Unfortunately, the use of auxiliary drive belts of this kind hardly enables the longitudinal flexure of the main belt to be limited to any appreciable extent, with the result that the conveyor still has to be provided with rollers in the same way as other conventional belt conveyors.

In addition, belts arranged in such a way as to obtain high transverse rigidity are also known. It is possible in this way, for example, to improve the level of comfort in cases where the belt is used for carrying people. However, it is necessary in this case as well to provide the conveyor with a large number of rollers in order to limit flexure of the belt in the longitudinal direction. Accordingly, it is not possible in conventional belt conveyors to reduce the number of rollers used without undesirably increasing deformation of the belt along the straight sections of its path intended for carrying loads.

SUMMARY OF THE INVENTION

An object of the invention is to obviate these disadvantages by providing the conveyor belt on the one hand with a very high level of rigidity, at least in the longitudinal direction, along the straight sections intended for carrying loads along its path and, on the other hand, with adequate flexibility in the longitudinal direction at those places where it has to undergo changes in level beyond these straight sections.

A further object of the invention is also to provide a belt conveyor which makes it possible to eliminate the need for a large number of supporting rollers without, at the same time, increasing the flexure of the conveyor belt in the longitudinal direction along the straight sections of its path.

The invention contemplates a conveyor belt comprising two elementary individually flexible bands each provided on one side thereof with a series of projections which are regularly spaced apart and arranged so as to provide a series of corresponding intermediate spaces having substantially the same size and shape as said projections whereby the projections of each band are closely engageable in the intermediate spaces of the other band and each band having a longitudinal reinforcement, the whole arrangement being such that when the two individually flexible bands are supported in engagement with one another these bands together constitute in the regions of engagement a rigid beam with a high resistance to deflection, at least in the longitudinal direction thereof.

The invention also provides a belt conveyor which is distinguished by the fact that it comprises two mobile, flexible elementary belts and guide means arranged in such a way as to superpose these two belts and to keep them in contact along at least one straight section of their path intended for carrying loads; by the fact that each of the elementary belts is reinforced at least longitudinally in the vicinity of the neutral axis of the belt; by the fact that, on its surface opposite the other belt, each of the elementary belts comprises a plurality of projections and recesses distributed regularly and arranged in such a way that the projections of one belt fit exactly into the recesses of the other belt during the superposition and contacting of the belts, and hold them firmly together at least along their longitudinal axis so that, on the one hand, the belts form a rigid beam with high flexural strength along said straight section and, on the other hand, can be separated from one another beyond said straight section.

Accordingly, this firm hold of the two elementary belts obtained by virtue of the exact fit of said projections and recesses in accordance with the invention enables all the shearing forces attributable to flexural stresses, at least in the longitudinal direction, to be transmitted from each of the elementary superposed belts to the other. In this way, the two belts held firmly together behave like a highly rigid, composite beam over the straight sections of the path of the conveyor.

This composite beam has a new neutral axis which is remote from those of the elementary belts and, hence, from the two reinforcements provided therein. Accordingly, the overall flexural strength of the composite beam is far greater than the sum of the individual flexural strengths of the two belts.

For example, simple calculation shows that a beam of this kind made of rubber ($E_c = 80$ kg/cm$^2$) with a total thickness of 24 mm, strengthened by two polyester fabric reinforcements ($E_A = 3000$ kg/cm$^2$) 1 mm thick arranged at a distance of 18 mm apart from one another, makes it possible to obtain a total apparent modulus of elasticity E of 490 kg/cm$^2$, i.e. a rigidification factor $E/E_c$ of about 6 in relation to a non-reinforced rubber beam (or a rubber beam reinforced in the vicinity of its neutral axis.) In other words, for the same moment of inertia, the composite beam reinforced in this way is six times more rigid than a conventional belt. Now, it is obvious that any reinforcement with an even higher elasticity modulus, such as a metal or glass-fibre reinforcement, enables an even higher rigidification factor to be obtained. For example, a glass-fibre reinforcement would give the following rigidification factor:

$$E/E_c = 0.85 \times 10^5$$

while a steel reinforcement would give the following rigidification factor:

$$E/E_c = 3 \times 10^5$$

Unlike this double reinforcement optimally obtained in a reinforced, composite beam of this kind, a reinforcement embedded in the vicinity of the neutral axis of a single belt has hardly any effect upon its flexural strength. Accordingly, the two elementary belts separated from one another beyond said straight section of the path followed by the belt are each flexible enough to follow any required change in level.

By virtue of this appreciable rigidification effect obtained temporarily each time along the straight sections of the path of the conveyor, it is possible to eliminate the need for a large number of supporting rollers by increasing the spacing between them. Accordingly, it is possible to reduce considerably the investment and maintenance costs of the conveyor.

The elementary belts can be fitted together by any suitable means of engagement provided that the shearing forces attributable to flexure can be transmitted from one belt to the other through their engagement, at least in the longitudinal direction, so that, in the event of flexural stressing, these two elementary, superposed belts behave like a composite beam with a new neutral axis.

An embodiment of the belt conveyor according to the invention and various modifications of its mounting are described by way of example in the following and illustrated diagrammatically in the accompanying drawings, wherein.

Figure 1:
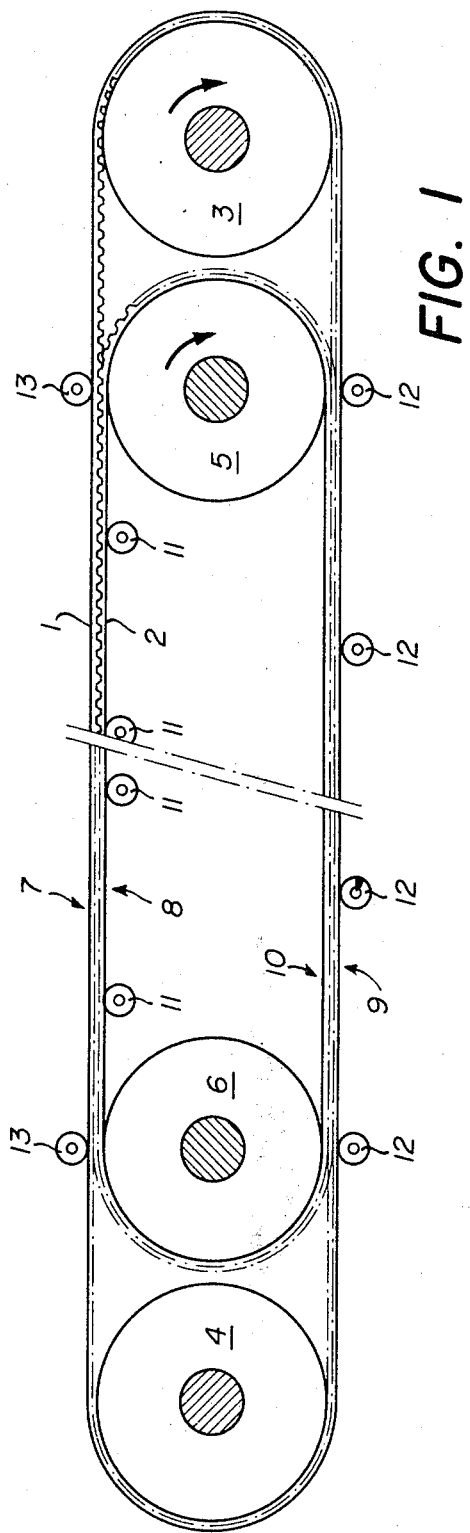
FIG. 1 is an elevation of this embodiment of an endless conveyor belt.

As can be seen from FIG. 1, the endless-belt conveyor of this embodiment comprises two flexible elementary belts 1 and 2 each arranged around a pair of drums 3, 4 and 5, 6 respectively, in such a way that they are superposed at their upper flights 7, 8 and lower flights 9, 10 on the one hand, and separated at their respective drums on the other hand.

In addition, the conveyor is equipped with two series of rollers 11 and 12 which respectively support the upper and lower flights 8 and 9, and guide the elementary belts 1 and 2 in contact with one another in their superposed position. In addition, an outer roller 13 is arranged at each end of the upper flight 7 to bring the two elementary belts 1 and 2 together shows the drum 6 and to keep them in contact in their superposed position up to the point at which they separate above the drum 5. The two rollers 12 arranged at the ends of the lower flight 9 perform essentially the same function in regard to the return flight.

Figure 2:
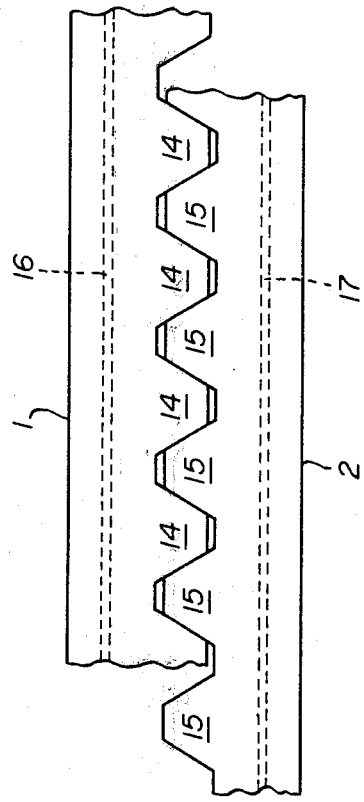
FIGS. 2, 6 and 7 show constructional details.

As can be seen from FIG. 2, the elementary belts 1 and 2 are each provided with transverse teeth, the teeth 14 on the inner surface of the belt 1 fitting exactly into the outer teeth 15 of the belt 2, so that the two belts are held firmly together in the longitudinal direction along their superposed flights 7, 8 and 9, 10 respectively.

Each profiled elementary belt 1 and 2 is made of a flexible material, such as rubber, and in addition is reinforced at 16 and 17, respectively, for example with metal netting embedded along the neutral axis of the respective profiled belt.

The interlocking teeth 14, 15 and the reinforcements 16, 17 provide for greatly increased rigidity in the upper flight of the conveyor belt by virtue of the fact that, as already explained, the interlocked flights 7 and 8 form a "composite beam" with a high flexural strength by virtue of the exact fit of the teeth 14 and 15.

Figure 6:
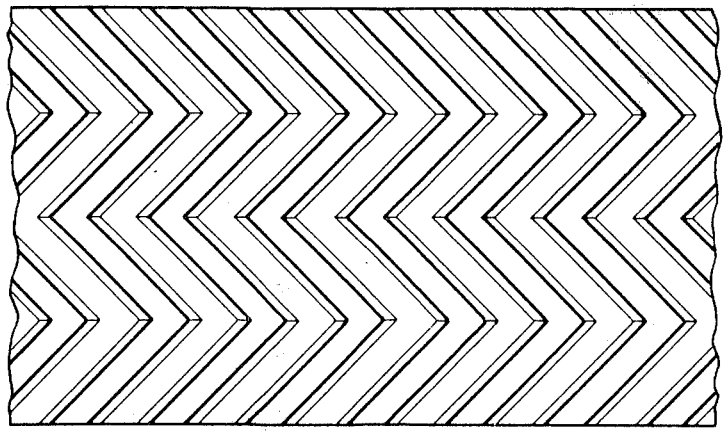
Figure 7:
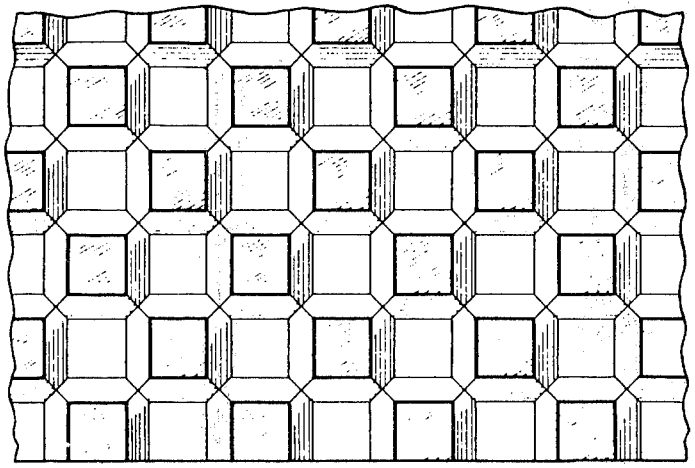

The transverse teeth described can of course be replaced by other means of engagement, such as inclined teeth or double-helical teeth (see FIG. 6) or even interlocking, cellular surfaces (see FIG. 7), thus enabling shearing stresses to be transmitted in both directions and, hence, providing for increased rigidity both in the transverse and in the longitudinal direction.

In the mounting illustrated in FIG. 1, the drums 3, 5 and 4, 6 are used for separating and reversing the elementary belts 1 and 2 at the two ends of the flights of the conveyor belt. In addition, the drums 3 and 5 are drive drums driven in the direction indicated by electric motors or by any other suitable drive means providing for synchronized travel of the two elementary belts, while the drums 4 and 6 are mounted for free rotation.

Instead of using a drive drum 3 with a smooth surface, as illustrated in FIG. 1, it is also possible to use a drum provided with teeth corresponding to the teeth 15 of the elementary belt 1, thus enabling that belt to be positively driven. In this way, it is possible to reduce the initial tension of the belt relative to that required for friction drive by the smooth drive drum.

Figure 3:
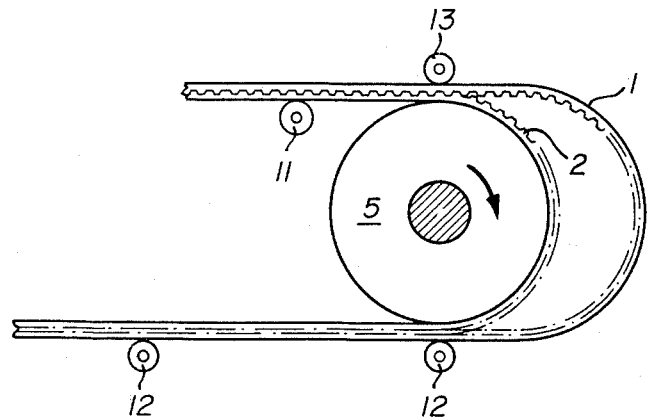
FIG. 3 shows a modification of the mounting of the belt illustrated in FIG. 1.

It is obvious that drive can be effected in many different ways using several drums or only a single drum, because there are several mounting possibilities enabling the elementary, superposed belts to be driven simultaneously, and separated and interlocked at the ends of their upper and lower flights. For example, FIG. 3 shows a modified mounting using only a single drive drum 5 around which is guided the inner elementary belt 2 by which the belt 1 is driven. In this case, it would be possible to use a similar drum 6 (not shown in FIG. 3) mounted at the other end of the horizontal path of the belt 2, while the belt 1 separates automatically from the belt 2, as illustrated in FIG. 3 without any need to use special guide or drive drums associated with the belt 1. However, it is obvious that any combination of the mounting systems described above in reference to FIGS. 1 and 3 can also be used. For example, it is possible to use a single drum upstream of the conveying path and two drums downstream on the drive side.

Figure 4:
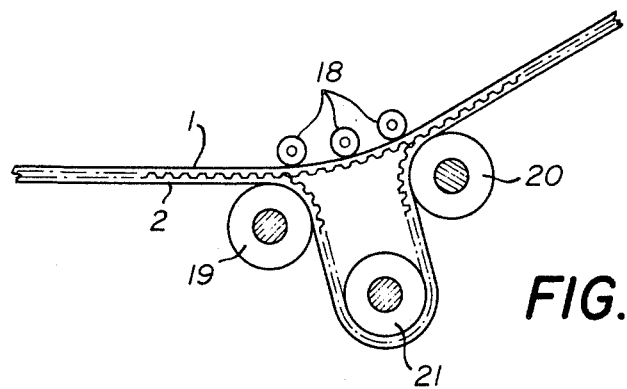
FIGS. 4 and 5 illustrate modified mountings intended respectively for concave and convex changes in level.
Figure 5:
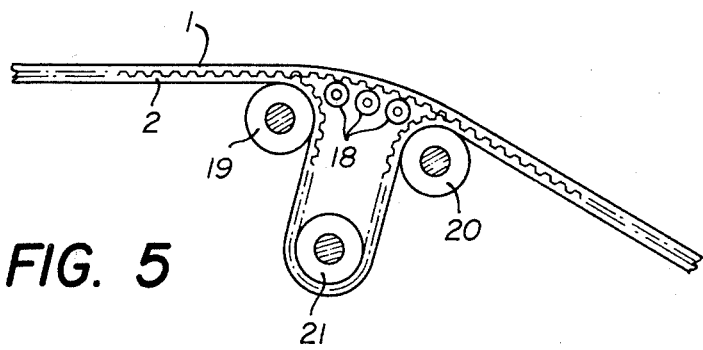

In addition, FIGS. 4 and 5 show mounting systems intended to effect changes in direction of the conveyor belt. In the modification illustrated in FIG. 4, which is intended to effect a concave change in level relative to the loading surface of the upper elementary belt 1, guide rollers 18 mounted for free rotation are arranged above the belt 1 according to the change required in the path of that belt. In addition, diverting rollers 19 and 20 are arranged below the lower elementary belt 2 on either side of the transition zone, while a roller 21 arranged on the other face of the belt 2 is used to separate that belt from the belt 1 in the transition zone.

The mounting illustrated in FIG. 5 is similar to that illustrated in FIG. 4, except that the change in level is convex in relation to the outer surface of the belt 1. In this case, rollers 19 and 21 are arranged in substantially the same way relative to the belt 2, but the guide rollers 18 are now arranged on the opposite side of the belt 1 to divert it downwards.

The straight sections of the juxtaposed belts 1 and 2 are in addition provided with supported rollers (not shown in FIGS. 3 and 4) arranged below the elementary belt 2 on either side of said transition zone.

The endless elementary belts can be mounted in any other required manner, for example in the form of two superposed loops brought into contact and interlocked with one another by engagement means arranged on the outer surfaces of the belts.

It may be noted that the teeth of the bands may have any appropriate profile allowing close engagement with the corresponding cavities and may have flanks (plane or curved) which may be inclined with respect to the bands as is shown in the drawing. Thus, for example, these flanks may form an angle lying between 5° and 300° with respect to a plane perpendicular to the band. In addition, the flexible rubber bands may be provided with teeth made of hard rubber or having a reinforcement, or both, in order to increase their resistance.

I claim:

1. A belt conveyor having at least one straight load bearing zone and comprising:
   a. a pair of flexible elementary belts each having a neutral axis and a reinforcing layer embedded in the vicinity of said neutral axis so as to reinforce each belt at least longitudinally;
   b. a regular array of projections and intermediate recesses arranged on one side of each elementary belt so that the projections of one belt fit exactly into corresponding recesses of the other belt thereby to provide positive engagement with rigid interlocking of the elementary belts so as to render them solid with each other, at least longitudinally by their superposition and positive engagement along straight portions thereof; and
   c. belt guide means which define the paths of the elementary belts so as to provide: first curved path portions arranged to bring the elementary belts progressively together into mutual positive engagement and rigidly interlocked relationship at one end of said load bearing zone of the conveyor; a common straight path portion wherein the superposed elementary belts remain positively engaged and rigidly interlocked from said one end to the opposite end of the straight load bearing zone and are thereby made solid with each other at least longitudinally whereby to transmit shear forces due to flexure from one belt to the other, so that the elementary belts thereby form together a straight, rigid composite beam assembly wherein the respective reinforcing layers of the belts of this assembly exert a combined reinforcing action providing substantial rigidification of the composite beam assembly; and second curved path portions arranged to progressively disengage and thereby separate said elementary belts beyond said opposite end of the load bearing zone, whereby said belts may separately undergo a desired directional change along their respective second curved path portions.

2. A conveyor as claimed in claim 1, wherein the projections on the two elementary belts are identical teeth which interengage exactly in the intermediate recesses and transmit the longitudinal shearing forces due to flexural deformation.

3. A conveyor as claimed in claim 1, wherein the two belts further comprise identical transverse teeth.

4. A conveyor as claimed in claim 1, wherein the two elementary belts comprise identical diagonal teeth which engage exactly in one another and transmit the longitudinal and transverse shearing forces attributable to flexural deformation.

5. A conveyor as claimed in claim 1, wherein the two elementary belts comprise identical, double-helical teeth which engage exactly in one another and transmit the longitudinal and transverse shearing forces attributable to flexural deformation.

6. A belt conveyor as claimed in claim 1 comprising support means disposed at said straight section of the path of the belts for supporting said interlocked belts.

7. A belt conveyor as claimed in claim 6 wherein said support means comprises at least one roller on which the interlocked belts rest in said straight section.

8. A belt conveyor as claimed in claim 1 wherein the belts are interlocked in a common section of the upper flights thereof and further comprising at least one support roller disposed between said drums and on which the interlocked belts in said common section are supported.

9. A belt conveyor as claimed in claim 8 wherein said belts are also interlocked at the lower flights, the inner belt passing over one curved path portion while the outer belt travels in proximity to said pair of drums and forms return loops thereat, said belts being substantially identical and having the same thickness and placement of reinforcement means therein; the common sections of engagement of the belts which represent the major portion of the length of the belts being of substantially greater length than the regions in which the belts are out of contact with one another at said curved portions.

* * * * *